United States Patent Office 3,274,138
Patented Sept. 20, 1966

3,274,138
PETROLEUM MULCH FILM
Robert H. Salvesen, Clark, N.J., assignor to Esso Research and Engineering Company, a corporation of Delaware
No Drawing. Filed Apr. 15, 1964, Ser. No. 360,096
1 Claim. (Cl. 260—28.5)

This invention relates to establishing and sustaining agricultural crops in semi-arid areas through the use of an improved petroleum based coating. In particular, this invention concerns petroleum base coatings having improved moisture vapor retention properties which coatings, when applied over seed beds, allow the establishing and sustaining of crops on land which ordinarily receives an insufficient amount of natural rainfall to provide sufficient moisture in the soil for seed germination and which sustains the growth of such crops during the critical seedling stage without irrigation. More particularly, this invention concerns petroleum based coating compositions having improved moisture vapor retention characteristics obtained by the inclusion of critical amounts of a linear hydrocarbon polymer such as polyethylene or polypropylene.

The problem of cultivating crops in semi-arid areas has faced mankind since time immemorial. This problem has become even more critical in recent years due to the great expansion in the population of the world. Now, more than ever, it is necessary to utilize every possible acre to either directly support crops or to support animals from which man may draw his sustenance.

In order to provide the moisture necessary for both seed germination and early plant growth in areas of low rainfall, it has recently been suggested that petroleum based coatings mainly in the form of asphalt emulsions be applied over the seed beds. This suggestion and a description of the technique utilized are contained in U.S. Patent 3,061,974, issued November 6, 1962, to Robert A. Louis and Irving F. Wagner.

The critical features of the coating technique are (1) protection from evaporation losses is provided directly above the seed bed and (2) replenishment of moisture expended in plant growth is allowed when rainfall is available. These requirements are met by employing a film of an asphalt comprising emulsion controlled in width over a moisture containing seed bed while leaving an area between seed rows open to receive normal rainfall. The emulsion is applied after seeding and, preferably, when the moisture content of the seed bed is at or near field capacity. Field capacity is defined as the amount of water held in the soil after excess water has drained away by gravitational force and after the rate of downward movement of water has materially decreased. The asphalt strip covering the seed bed then tends to function in a manner similar to a "one-way valve."

When a rainfall occurs which is sufficient to temporarily saturate the top layer of soil, the lateral movement of moisture is relatively rapid, i.e., at a rate of several inches per hour with some variance which is dependent upon the type of soil. When rainfall ceases and the field drains or is otherwise depleted of moisture to the level of field capacity or below, the rate of lateral migration drops off sharply until such movement is negligible and for all practical purposes may be considered as non-existent.

During the short periods of surface saturation, rainfall on the uncoated areas will move under the coated strips to replenish the moisture of the seed bed. When the saturated condition in the uncoated area ceases to exist, the moisture which has moved beneath the coated strips is trapped and its loss either by lateral movement or surface saturation is greatly retarded. Thus, by this technique the moisture obtained from infrequent and short periods of rainfall can be conserved at the very point where it is needed most so as to afford a luxuriant plant growth where uncoated seed beds are unable to sustain any desirable plant life.

It has now been discovered that the ability of petroleum based coatings to trap soil moisture and prevent its evaporation can be substantially improved by the addition of small critical amounts of a linear hydrocarbon polymer such as polyethylene either oxidized or unoxidized, polypropylene etc., into the coating composition. In particular, it has been observed that the addition of about 0.1 to 5.0 weight percent, preferably 0.5 to 2.0% weight percent, most preferably about 1.0 weight percent, of a low molecular weight oxidized polyethylene into an asphalt mulch formulation reduced the moisture loss in test soil by 4–5 times compared to similar soil coated with the mulch formulations of the prior art cited above. In this specification, weight percents are based on the total weight of the emulsified product.

The petroleum based coatings suitable for use with this invention are preferably asphalt emulsions which emulsions may be either acidic (cationic) or basic (anionic) although the acidic emulsions are preferred. Both types of emulsions are asphalt-in-water emulsions. Typical specifications for both types are listed in the following table:

TABLE I.—CHARACTERISTICS AND COMPOSITION OF ACIDIC AND BASIC EMULSIONS

| | Basic | Acidic |
|---|---|---|
| Emulsion characteristics: | | |
| Viscosity, Saybolt Furol at 77° F. | 20–200 | 20–200 |
| Residue (by distillation) wt. percent | 57–70 | 57–70 |
| Settlement, 5 days, wt. percent | 0–3 | 0–3 |
| Residue characteristics: | | |
| Penetration at 77° F., 100 g., 5 sec. | 85–200 | 10–200 |
| Solubility in $CS_2$, percent | 97+ | 97+ |
| Ductility at 77° F., cm | 40+ | 40+ |
| Softening Point, ° F | 100–125 | 100–175 |
| Composition, wt. percent: | | |
| Water | 70–30 | 70–30 |
| Asphalt | 30–70 | 30–70 |
| Emulsifier (Preferably polyamines for acidic emulsions, fatty acids for basic): | | |
| NaOH | 0.6–0.8 | |
| HCl (36%) | | 0.1–0.5 |
| Linear hydrocarbon polymer | 0.1–5.0 | 0.1–5.0 |

Suitable emulsifying agents for use in preparing these emulsions include the following:

Cationic agents:
(1) Primary, secondary, tertiary, and polyamine salts such as the diamine dichloride

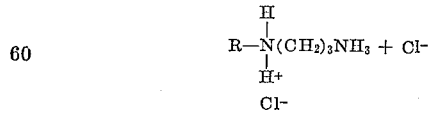

where R is an alkyl chain with 16–18 carbon atoms. In general, the alkyl chains of the amines may contain 8–22 carbon atoms with 16–18 being preferred.

(2) Amines such as those used in forming the salts of (1) condensed with 1–10 moles of ethylene oxide per mole of amine such as

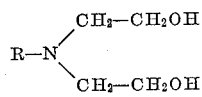

wherein R is as defined in (1).

(3) Quaternary ammonium salts such as $$[R_3\text{—}N]^+ \text{ } Cl^-$$

(4) Dimethylated amine salts such as

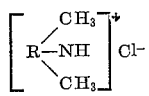

(5) Aromatic amine salts and cyclic amide salts.
(6) 2-imidazoline.

Anionic agents:
Alkali metal salts of fatty acids such as

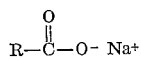

where R is an alkyl chain with 8–22 carbon atoms, preferably 14–18. The potassium salt may also be used. Also, the emulsifying agent is not always one specific compound but could be a mixture of salts of fatty acids in which R varies in length. Examples of these are a sodium salt of pine wood lignin and a salt of a long chain acid resin from the destructive distillation of pine wood stumps; also fine clays such as bentonite can be used.

Whereas the actual emulsifying agents for the cationic and anionic emulsions are the amine salts or fatty acid salts, these salts are usually formed in the aqueous emulsifying solution by reaction of the amine with an acid such as HCl and the fatty acid with a base such as NaOH. Possible substitutes for the HCl and NaOH therefore exist. Acetic acid ($CH_3COOH$) or nitric acid ($HNO_3$) could be used instead of HCl on a mole per mole basis. Also, KOH could be used instead of NaOH although the latter is cheaper.

Other petroleum products may be used in lieu of asphalt in these emulsions or as non-emulsified liquids providing they are of a suitable viscosity for application by spraying, form a continuous film which is penetrable to young seedlings but essentially impenetrable to water, and do not possess a high degree of herbicidal properties. Suitable petroleum products for this use include crude oils low in sulfur content, petroleum waxes, wax and asphalt mixes, residua, etc.

The linear hydrocarbon polymer utilized in the practice of the present invention is preferably a low molecular weight oxidized polyethylene. The reason for the preference is that ordinary non-oxidized polyethylene does not give equivalent beneficial results when used in the same manner. The molecular weight range of the polyethylene should be between 1,000 to 10,000, preferably in the range between 2,000 to 5,000. A particularly desirable form of polyethylene is in the oxidized form and is designated under the trade name Epolene E as supplied by Tennessee Eastman Company. The Epolene E oxidized polyethylene has a molecular weight of about 2500.

The preparation and application of petroleum based coatings to seed beds are extensively described in U.S. Patent 3,061,974, which description is incorporated herein by reference. The desired quantity of the linear hydrocarbon polymer is admixed with the petroleum product, e.g. asphalt, prior to the emulsification of the petroleum product with water. The emulsion compositions of the present invention may be obtained by mixing the ingredients in any manner known to the art, e.g. by stirring, milling, centrifuging, etc.

The advantages obtained by employing linear hydrocarbon polymers, such as polyethylene and polypropylene in petroleum based coatings are readily apparent from an examination of comparative experimental results. These results are summarized by the following examples.

*Example 1*

A petroleum based coating composition essentially of the type described by the prior art was prepared by mixing the ingredients set forth in the following formulation.

50% 85–100 Pen Asphalt
0.3% Duomeen T ($RNHCH_2CH_2 \cdot CH_2NH_2$ were R=tallow)
0.47% concentrated HCl
3% petroleum distillate solvent
46.23% water

*Example 2*

An emulsion was prepared in the manner of Example 1 with the exception that 0.3% of a low molecular weight oxidized polyethylene (Epolene E, M.W.=2,500) was included and the water content of the emulsion was reduced to 46.03% to reflect the difference in concentration.

*Example 3*

An emulsion was prepared in the manner of Example 1 with the exception that 0.5% of a low molecular weight oxidized polyethylene (Epolene E, M.W.=2,500) was utilized and the water content of the emulsion was reduced to 45.73% to reflect the difference in concentration.

*Example 4*

An emulsion was prepared in the manner of Example 1 with the exception that 0.75% of a low molecular weight oxidized polyethylene (Epolene E, M.W.=2,500) was included and the water content of the emulsion was reduced to 45.48% to reflect the difference in concentration.

*Example 5*

An emulsion was prepared in the manner of Example 1 with the exception that 1.0% of a low molecular weight oxidized polyethylene (Epolene E, M.W.=2,500) was included and the water content of the emulsion was reduced to 45.23% to reflect the difference in concentration.

*Example 6*

An emulsion was prepared in the manner of Example 1 with the exception that 1.25% of a low molecular weight oxidized polyethylene (Epolene E, M.W.=2,500) was included and the water content of the emulsion was reduced to 44.98% to reflect the difference in concentration.

*Example 7*

An emulsion was prepared in the manner of Example 1 with the exception that 1.5% of a low molecular weight oxidized polyethylene (Epolene E, M.W.=2,500) was included and the water content of the emulsion was reduced to 44.73% to reflect the difference in concentration.

*Example 8*

An emulsion was prepared in the manner of Example 1 with the exception that 2% of a low molecular weight oxidized polyethylene (Epolene E, M.W.=2,500) was utilized and the water content of the emulsion was reduced to 44.23% to reflect the difference in concentration.

*Example 9*

An emulsion was prepared in the manner of Example 1 with the exception that 5.0% of a low molecular weight oxidized polyethylene (Epolene E, M.W.=2,500) was utilized and the water content of the emulsion was reduced to 41.23% to reflect the difference in concentration.

*Example 10*

An emulsion was prepared in the manner of Example 1 with the exception that 0.2% of a low molecular weight non-oxidized polyethylene (Epolene N, M.W.=2,500)

was included and the water content of the emulsion was reduced to 46.03%.

*Example 11*

An emulsion was prepared in the manner of Example 1 with the exception that 0.5% of a low molecular weight non-oxidized polyethylene (Epolene N, M.W.= 2,500) was included and the water content of the emulsion was reduced to 45.73%.

*Example 12*

An emulsion was prepared in the manner of Example 1 with the exception that 1.0% of a low molecular weight non-oxidized polyethylene (Epolene N, M.W.=2,500) was included and the water content of the emulsion was reduced to 45.23%.

*Example 13*

An emulsion was prepared in the manner of Example 1 with the exception that 2.0% of a low molecular weight non-oxidized polyethylene (Epolene N, M.W.=2,500) was included and the water content of the emulsion was reduced to 44.23%.

*Example 14*

An emulsion was prepared in the manner of Example 1 with the exception that 0.5% of an isotactic polypropylene was included and the water content of the emulsion was reduced to 45.73%.

*Example 15*

An emulsion was prepared in the manner of Example 1 with the exception that 2.0% of an isotactic polypropylene was included and the water content of the emulsion was reduced to 44.23%.

*Example 16*

Water retention tests were run on moist soil (containing about 16% water) in 8-inch x 8-inch x 2-inch glass trays. The soil was compacted ¼ of an inch with a hand roller and then coated by spraying with 25 grams of the petroleum based mulches of Examples 1–15. This application rate is equivalent to about 600 gallons of mulch per acre. The trays were then checked for weight loss as a function of time for up to 12 weeks. Results were taken in duplicate for each example run and were averaged. The averaged results are summarized in Table II below.

The results obtained from the Example 5 composition which contained 1.0 wt. percent oxidized polyethylene unexpectedly show a substantially lower moisture loss than the corresponding results obtained from all other additive containing mulches and therefore is considered the composition of preference.

Finally, and unexpectedly, the inclusion of 5.0% of the low molecular weight oxidized polyethylene into the petroleum based coating composition results in a composition having inferior moisture loss prevention properties as the petroleum based coating not containing any oxidized polyethylene. Thus, the increased addition of oxidized polyethylene past the critical concentration range is shown to reverse the beneficial effects of the oxidized polyethylene addition. This is probably due to the substantial increase in viscosity of the 5% oxidized polyethylene blend which does not expand and contract with temperature changes as the lower viscosity blends containing less polyethylene.

When utilizing the compositions of the present invention to coat seed beds, it is desired that said coating be limited in width. It is necessary that the width of such coated strips be sufficiently wide to afford protection from surface evaporation from an area directly above and within close proximity of the seed or plant roots. At the same time, to take advantage of subsequent rainfalls the strips must be sufficiently narrow to permit lateral migration of water during short periods of surface saturation to reach all of the area immediately below the coating. This will to some extent be dependent upon the amount of rainfall during the growing season, the frequency of rainfall during the growing season, and the type of soil upon which the application is made.

However, the present invention can be satisfactorily practiced using strips over the seed rows having a width in the range of 2–15, preferably 3–10, inches. Range grasses as well as other crops in semi-arid regions are preferably established as row crops with such rows spaced apart a distance in the range of about 7–42 inches, preferably 12–36 inches, to conserve moisture. The stripping technique provides the maximum moisture protection with the minimum of coating material. The film over the seed row should be a continuous one and of a thickness and consistency suitable for penetration by young plants or seedlings. The petroleum based coating composition including the oxidized polyethylene may be applied by

TABLE II.—EFFECT OF ADDITIVES ON MOISTURE LOSS THROUGH MULCH FILM

| Petroleum Based Coatings of Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Weight percent additive | 0 | 0.2[2] | 0.5[1] | 0.75[1] | 1.0[1] | 1.25[1] | 1.5[1] | 2.0[1] | 5.0[1] | 0.2[2] | 0.5[2] | 1.0[2] | 2.0[2] | 0.5[3] | 2.0[3] |
| Percent weight loss after: | | | | | | | | | | | | | | | |
| 1 day | 6.5 | | | | 1.3 | | | 8 | 3.8 | | 1.5 | | (4) | 3.8 | 2.0 |
| 2 days | 11.3 | 2.5 | 4.5 | 5.0 | 3.3 | | | | | 7.3 | 2.3 | 7.8 | | | |
| 3 days | | | | | 3.3 | 5.0 | 12 | | | | | | | | |
| 4 days | | | | 8.8 | 3.3 | | | 13 | 36.3 | | | | | | |
| 5 days | 25.1 | 6.8 | | 10.8 | 3.3 | 7.0 | | | | 10.9 | 7.1 | 10.1 | | 14.4 | 9.1 |
| 6 days | 30.0 | 11.5 | 9.8 | 12.3 | 3.4 | 8.3 | | 16.5 | 47 | | | | | | |
| 7 days | 35.0 | | | | 3.5 | 9.5 | 24 | | | 14.9 | 10.6 | 13.9 | | 18.7 | 11.9 |
| 8 days | | | 12.5 | 23.8 | 3.8 | 17.5 | | 20 | 52.8 | | | | | | |
| 2 weeks | 54.0 | 24.9 | 21.8 | 37.5 | 4.4 | | 42.75 | 31.3 | 57.8 | 26.3 | 22.2 | 22.4 | | 25.1 | 18.7 |
| 3 weeks | | 34.3 | 31 | 47.6 | 5.3 | 30 | 60 | 45 | 60 | 35.4 | 27.6 | 29.8 | | 34.8 | 23.3 |
| 4 weeks | | 40.0 | 47.5 | 60 | 7.5 | 37.5 | | 54.3 | | 37.8 | | 31.8 | | 41.6 | 26.2 |
| 5 weeks | | 44 | 53.8 | | 8.8 | 55 | | 56.5 | | 46.5 | 35.6 | 39.3 | | 49.8 | 31.1 |
| 6 weeks | | 56.5 | 62.5 | | 11.4 | | | | | 53.3 | 41.5 | 45.2 | | | |
| 7 weeks | | | | | 12.6 | | | | | | 46.2 | | | | 40.0 |
| 8 weeks | | | | | 15.0 | | | | | | | | | | 42.2 |
| 9 weeks | | | | | 17.1 | | | | | | | | | | |
| 10 weeks | | | | | | | | | | | | | | | 54.5 |
| 11 weeks | | | | | | | | | | | | | | | 59.6 |
| 12 weeks | | | | | 33.0 | | | | | | | | | | |

[1] Epolene E.
[2] Epolene N.
[3] Isotactic Polypropylene.
[4] Product not stable enough to test.

The petroleum based coatings derived from Examples 2–8, 10–15 show improvement in the retention of moisture in soils covered with an additive containing mulch when compared with soils treated with the base mulch.

any method suitable for leaving a thin continuous film over the seed bed. The preferred method for effecting this application is by spraying, employing either conventional pressure or air atomization techniques.

What is claimed is:

A petroleum mulch having improved moisture retention properties comprising about 50 wt. percent asphalt, about 50 wt. percent water and about 1 wt. percent oxidized polyethylene having a molecular weight of about 2500.

References Cited by the Examiner

UNITED STATES PATENTS

| | | | |
|---|---|---|---|
| 2,765,288 | 10/1956 | Whittier et al. | 260—28 |
| 3,007,825 | 11/1961 | Cubberly et al. | |
| 3,061,974 | 11/1962 | Louis et al. | 47—9 |
| 3,097,179 | 7/1963 | Ceintrey | 260—28.5 |
| 3,099,897 | 8/1963 | Letteron | 47—9 |

FOREIGN PATENTS 658,987    3/1963    Canada.

OTHER REFERENCES

"Epolene" (Eastman low molecular weight polyethylene) Bulletin No. F110 (63–147.7), 3 pp. about 1963.

MORRIS LIEBMAN, *Primary Examiner.*

ABRAHAM G. STONE, ALEXANDER H. BRODMERKEL, *Examiners.*

R. E. BAGWILL, *Assistant Examiner.*